(12) United States Patent
Millard et al.

(10) Patent No.: US 10,930,937 B2
(45) Date of Patent: Feb. 23, 2021

(54) FLOW BATTERIES INCORPORATING ACTIVE MATERIALS CONTAINING DOUBLY BRIDGED AROMATIC GROUPS

(71) Applicant: Lockheed Martin Energy, LLC, Bethesda, MD (US)

(72) Inventors: Matthew Millard, Cambridge, MA (US); Zachariah M. Norman, Belmont, MA (US)

(73) Assignee: Lockheed Martin Energy, LLC, Bethesda, MD (US)

(*) Notice: Subject to any disclaimer, the term of this patent is extended or adjusted under 35 U.S.C. 154(b) by 258 days.

(21) Appl. No.: 15/360,918

(22) Filed: Nov. 23, 2016

(65) Prior Publication Data

US 2018/0145336 A1 May 24, 2018

(51) Int. Cl.
*H01M 8/04276* (2016.01)
*H01M 4/90* (2006.01)
(Continued)

(52) U.S. Cl.
CPC ............ *H01M 4/9008* (2013.01); *C07F 7/28* (2013.01); *H01M 8/04276* (2013.01);
(Continued)

(58) Field of Classification Search
CPC .... H01M 8/04276; H01M 8/188; H01M 8/20; H01M 4/9008; Y02E 60/528; Y02E 60/50; C07F 7/28
See application file for complete search history.

(56) References Cited

U.S. PATENT DOCUMENTS

| 1,279,295 A | 9/1918 | Downs |
| 1,988,575 A | 1/1935 | Schmidt |
(Continued)

FOREIGN PATENT DOCUMENTS

| CN | 1284208 A | 2/2001 |
| CN | 101877412 | 11/2010 |
(Continued)

OTHER PUBLICATIONS

Vliet et al., "Hydroxyhydroquinone Triacetate," Organic Synthesys, 1941, Coll vol. 1, p. 317 (1941), vol. 4, p. 35 (1925) 3 pages.
(Continued)

*Primary Examiner* — Uyen M Tran
(74) *Attorney, Agent, or Firm* — BakerHostetler

(57) ABSTRACT

Electrolyte solutions for flow batteries and other electrochemical systems can contain an active material that is capable of transferring one or more electrons per molecule during an oxidation-reduction cycle. Doubly bridged aromatic groups or their coordination compounds can be particularly suitable active materials. Flow batteries can include a first half-cell containing a first electrolyte solution, and a second half-cell containing a second electrolyte solution, in which at least one of the first electrolyte solution and the second electrolyte solution contains an active material having at least two aromatic groups doubly bridged by a carbonyl moiety and a bridging moiety containing a bridging atom selected from carbon, nitrogen, oxygen, sulfur, selenium and tellurium. Such bridged compounds can directly function as the active material, or coordination compounds containing the bridged compounds as at least one ligand can serve as the active material.

19 Claims, 1 Drawing Sheet

(51) Int. Cl.
  *C07F 7/28* (2006.01)
  *H01M 8/18* (2006.01)
  *H01M 8/20* (2006.01)

(52) U.S. Cl.
  CPC .............. *H01M 8/188* (2013.01); *H01M 8/20* (2013.01); *Y02E 60/50* (2013.01)

(56) References Cited

U.S. PATENT DOCUMENTS

| | | |
|---|---|---|
| 2,353,782 A | 7/1944 | Neumark |
| 2,415,792 A | 2/1947 | Gravell |
| 3,294,588 A | 12/1966 | Morton |
| 3,425,796 A | 2/1969 | Bauer |
| 3,428,654 A | 2/1969 | Rubinfeld |
| 3,573,984 A | 4/1971 | Shah |
| 3,707,449 A | 12/1972 | Reinhardt et al. |
| 3,772,379 A | 11/1973 | Woodgate |
| 3,801,642 A | 4/1974 | Worrel |
| 3,876,435 A | 4/1975 | Dollman |
| 3,916,004 A | 10/1975 | Okada et al. |
| 3,919,000 A | 11/1975 | Yarrington |
| 3,920,756 A | 11/1975 | Tahara et al. |
| 3,929,506 A | 12/1975 | Leddy et al. |
| 3,985,517 A | 10/1976 | Johnson |
| 3,985,585 A | 10/1976 | Tuttle et al. |
| 4,046,861 A | 9/1977 | Reinhardt et al. |
| 4,064,324 A | 12/1977 | Eustace |
| 4,069,371 A | 1/1978 | Zito |
| 4,126,529 A | 11/1978 | DeBerry |
| 4,180,623 A | 12/1979 | Adams |
| 4,202,799 A | 5/1980 | Yoshimura et al. |
| 4,233,144 A | 11/1980 | Pace et al. |
| 4,362,791 A | 12/1982 | Kaneko et al. |
| 4,378,995 A | 4/1983 | Gratzfeld et al. |
| 4,410,606 A | 10/1983 | Loutfy et al. |
| 4,436,711 A | 3/1984 | Olson |
| 4,436,712 A | 3/1984 | Olson |
| 4,436,713 A | 3/1984 | Olson |
| 4,436,714 A | 3/1984 | Olson |
| 4,443,423 A | 4/1984 | Olson |
| 4,443,424 A | 4/1984 | Olson |
| 4,468,441 A | 8/1984 | D'Agostino et al. |
| 4,485,154 A | 11/1984 | Remick et al. |
| 4,520,083 A | 5/1985 | Prater et al. |
| 4,563,403 A | 1/1986 | Julian |
| 4,592,973 A | 6/1986 | Pemsler et al. |
| 4,617,244 A | 10/1986 | Greene |
| 4,680,308 A | 7/1987 | Schwartz et al. |
| 4,818,646 A | 4/1989 | Takakubo et al. |
| 4,880,758 A | 11/1989 | Heistand, II et al. |
| 4,952,289 A | 8/1990 | Ciccone et al. |
| 4,959,135 A | 9/1990 | Zenner et al. |
| 4,973,720 A | 11/1990 | Saito et al. |
| 5,084,533 A | 1/1992 | Shah et al. |
| 5,102,906 A | 4/1992 | Nakayama et al. |
| 5,122,461 A | 6/1992 | Hsiung et al. |
| 5,264,097 A | 11/1993 | Vaughan |
| 5,302,481 A | 4/1994 | Ong |
| 5,318,865 A | 6/1994 | Kaneko et al. |
| 5,433,934 A | 7/1995 | Chang et al. |
| 5,472,807 A | 12/1995 | Licht et al. |
| 5,643,670 A | 7/1997 | Chung |
| 5,679,239 A | 10/1997 | Blum et al. |
| 5,759,711 A | 6/1998 | Miyabayashi et al. |
| 5,785,841 A | 7/1998 | Tseng |
| 5,876,581 A | 3/1999 | Itaya et al. |
| 5,910,366 A | 6/1999 | Chowdhury et al. |
| 6,001,326 A | 12/1999 | Kim et al. |
| 6,030,517 A | 2/2000 | Lincot et al. |
| 6,054,230 A | 4/2000 | Kato |
| 6,461,772 B1 | 10/2002 | Miyake et al. |
| 6,475,661 B1 | 11/2002 | Pellegri et al. |
| 6,485,868 B1 | 11/2002 | Tsujioka et al. |
| 6,555,989 B1 | 4/2003 | Pearson |
| 6,585,951 B1 | 7/2003 | Hong et al. |
| 6,624,328 B1 | 9/2003 | Guerra |
| 7,046,418 B2 | 5/2006 | Lin et al. |
| 7,193,764 B2 | 3/2007 | Lin et al. |
| 7,223,833 B1 | 5/2007 | Nielsen et al. |
| 7,252,905 B2 | 8/2007 | Clarke et al. |
| 7,265,162 B2 | 9/2007 | Yandrasits et al. |
| 7,348,088 B2 | 3/2008 | Hamrock et al. |
| 7,463,917 B2 | 12/2008 | Martinez |
| 7,508,568 B2 | 3/2009 | Lin et al. |
| 7,550,231 B2 | 6/2009 | Stauffer |
| 7,557,164 B2 | 7/2009 | Felix et al. |
| 7,625,663 B2 | 12/2009 | Clarke et al. |
| 7,645,540 B2 | 1/2010 | Boone et al. |
| 7,678,728 B2 | 3/2010 | Olson et al. |
| 7,745,056 B2 | 6/2010 | Lee et al. |
| 7,767,777 B2 | 8/2010 | Buesing et al. |
| 7,927,731 B2 | 4/2011 | Sahu |
| 7,931,981 B2 | 4/2011 | Boone et al. |
| 7,935,366 B2 | 5/2011 | Pahuja et al. |
| 7,998,335 B2 | 8/2011 | Feeney et al. |
| 8,129,554 B2 | 3/2012 | Schwaiger |
| 8,187,441 B2 | 5/2012 | Evans et al. |
| 8,445,118 B2 | 5/2013 | Cordonier et al. |
| 8,492,581 B2 | 7/2013 | Frost et al. |
| 8,691,413 B2 | 4/2014 | Esswein et al. |
| 8,753,761 B2 | 6/2014 | Esswein et al. |
| 9,300,000 B2 | 3/2016 | Jansen et al. |
| 9,382,274 B2 | 7/2016 | Esswein et al. |
| 9,409,842 B1 | 8/2016 | Fu et al. |
| 2002/0177042 A1 | 11/2002 | Amendola |
| 2003/0068561 A1* | 4/2003 | Okahara .............. C07D 307/91 |
| | | 429/326 |
| 2003/0143456 A1 | 7/2003 | Kazacos et al. |
| 2003/0228394 A1 | 12/2003 | Abdel-Monem et al. |
| 2004/0096746 A1 | 5/2004 | Wietelmann et al. |
| 2005/0098437 A1 | 5/2005 | Shiepe |
| 2005/0244707 A1 | 11/2005 | Skyllas-Kazacos et al. |
| 2006/0047094 A1 | 3/2006 | Cherkasov et al. |
| 2007/0275291 A1 | 11/2007 | Gu et al. |
| 2008/0274385 A1 | 11/2008 | Creeth |
| 2008/0292964 A1 | 11/2008 | Kazacos et al. |
| 2009/0110998 A1 | 4/2009 | Miyachi et al. |
| 2009/0130525 A1 | 5/2009 | Miyachi et al. |
| 2009/0208807 A1 | 8/2009 | Miyachi et al. |
| 2009/0308752 A1 | 12/2009 | Evans et al. |
| 2010/0003586 A1 | 1/2010 | Sahu |
| 2010/0059388 A1 | 3/2010 | Clarke et al. |
| 2010/0086823 A1 | 4/2010 | Koshino et al. |
| 2010/0086983 A1 | 4/2010 | Gellett et al. |
| 2010/0239946 A1 | 9/2010 | Miyachi et al. |
| 2011/0014532 A1 | 1/2011 | Knuckey et al. |
| 2011/0136016 A1 | 6/2011 | Huang et al. |
| 2011/0189549 A1 | 8/2011 | Sun et al. |
| 2011/0195283 A1 | 8/2011 | Sun et al. |
| 2011/0200890 A1 | 8/2011 | Kocherginsky |
| 2011/0223450 A1 | 9/2011 | Horne et al. |
| 2011/0244277 A1 | 10/2011 | Gordon, II et al. |
| 2011/0244367 A1 | 10/2011 | Watahiki et al. |
| 2012/0052347 A1 | 3/2012 | Wilson et al. |
| 2012/0077095 A1 | 3/2012 | Roumi et al. |
| 2012/0107661 A1 | 5/2012 | Lee et al. |
| 2012/0135278 A1 | 5/2012 | Yoshie et al. |
| 2012/0171541 A1 | 7/2012 | Park et al. |
| 2012/0183868 A1 | 7/2012 | Toussaint et al. |
| 2012/0196188 A1 | 8/2012 | Zhang et al. |
| 2012/0202099 A1 | 8/2012 | Perry et al. |
| 2012/0208061 A1 | 8/2012 | Sahu et al. |
| 2012/0244406 A1 | 9/2012 | Xia et al. |
| 2012/0263990 A1 | 10/2012 | Kim |
| 2013/0004819 A1 | 1/2013 | Mun et al. |
| 2013/0115504 A1* | 5/2013 | Lee .......................... B01J 41/00 |
| | | 429/101 |
| 2013/0157087 A1 | 6/2013 | Pandy et al. |
| 2013/0252062 A1 | 9/2013 | Wilkins et al. |
| 2013/0252137 A1 | 9/2013 | Zhang et al. |
| 2014/0028260 A1 | 1/2014 | Goeltz et al. |
| 2014/0028261 A1 | 1/2014 | Esswein et al. |
| 2014/0030572 A1 | 1/2014 | Esswein et al. |
| 2014/0030573 A1 | 1/2014 | Esswein et al. |

(56) References Cited

U.S. PATENT DOCUMENTS

| | | | |
|---|---|---|---|
| 2014/0030631 A1 | 1/2014 | Esswein et al. | |
| 2014/0051002 A1 | 2/2014 | Esswein et al. | |
| 2014/0051003 A1 | 2/2014 | Esswein et al. | |
| 2014/0080035 A1* | 3/2014 | Esswein | H01M 8/20 429/499 |
| 2014/0138576 A1 | 5/2014 | Esswein et al. | |
| 2014/0178735 A1 | 6/2014 | Wang et al. | |
| 2014/0193687 A1 | 7/2014 | Park et al. | |
| 2014/0239906 A1 | 8/2014 | Anderson et al. | |
| 2014/0274936 A1 | 9/2014 | Piccariello et al. | |
| 2014/0302423 A1* | 10/2014 | Darling | H01M 8/188 429/498 |
| 2014/0349177 A1 | 11/2014 | Chung et al. | |
| 2014/0370403 A1 | 12/2014 | Narayan et al. | |
| 2014/0377666 A1* | 12/2014 | Kodama | H01M 10/0567 429/324 |
| 2015/0236543 A1 | 8/2015 | Brushett et al. | |
| 2015/0372333 A1 | 12/2015 | Odom et al. | |
| 2016/0066578 A1 | 3/2016 | Ala'Aldeen et al. | |
| 2016/0149251 A1 | 5/2016 | Reece | |
| 2016/0208165 A1 | 7/2016 | Li et al. | |
| 2016/0264603 A1 | 9/2016 | Esswein et al. | |
| 2016/0268623 A1 | 9/2016 | Esswein et al. | |
| 2016/0272659 A1 | 9/2016 | King et al. | |
| 2016/0276693 A1 | 9/2016 | Goeltz et al. | |
| 2016/0276694 A1 | 9/2016 | Goeltz et al. | |
| 2016/0276695 A1 | 9/2016 | Esswein et al. | |
| 2017/0253620 A1 | 9/2017 | Humbarger et al. | |
| 2017/0256811 A1 | 9/2017 | Humbarger et al. | |
| 2017/0271704 A1 | 9/2017 | Morris-Cohen | |
| 2018/0029965 A1 | 2/2018 | Millard | |
| 2018/0029966 A1 | 2/2018 | Millard et al. | |
| 2018/0105544 A1 | 4/2018 | Humbarger et al. | |

FOREIGN PATENT DOCUMENTS

| | | | |
|---|---|---|---|
| EP | 0814527 A2 | 12/1997 | |
| EP | 1290068 A2 | 3/2003 | |
| EP | 1411576 A1 | 4/2004 | |
| EP | 1901379 A1 | 3/2008 | |
| EP | 2235781 A1 | 10/2010 | |
| EP | 2463950 A1 | 6/2012 | |
| FR | 1533662 A | 7/1968 | |
| GB | 1354886 A | 6/1974 | |
| WO | WO-95/12219 A1 | 5/1995 | |
| WO | WO-1997/017354 A1 | 5/1997 | |
| WO | WO-00/56302 A2 | 9/2000 | |
| WO | WO-2004/095602 A2 | 11/2004 | |
| WO | WO-2006/135958 A1 | 12/2006 | |
| WO | WO-2007/044852 A2 | 4/2007 | |
| WO | WO-2007/101284 A1 | 9/2007 | |
| WO | WO-2011/075135 A1 | 6/2011 | |
| WO | WO-2011/098781 A1 | 8/2011 | |
| WO | WO-2011/149624 A1 | 12/2011 | |
| WO | WO-2012012743 A1 * | 1/2012 | H01M 10/05 |
| WO | WO-2012/075810 A1 | 6/2012 | |
| WO | WO-2013/006427 A1 | 1/2013 | |
| WO | WO-2013/048603 A1 | 4/2013 | |
| WO | WO-2014/052682 A2 | 4/2014 | |
| WO | WO-2015/069439 A1 | 5/2015 | |

OTHER PUBLICATIONS

International Search Report and Written Opinion dated Jan. 19, 2017 from International Application No. PCT/US16/58433.
International Search Report and Written Opinion dated Feb. 17, 2017 from International Application No. PCT/US16/65159.
Wang et al., "Issues in Freeze Drying of Aqueous Solutions," Chinese Journal of Chemical Engineering, 2012, 20(3), pp. 551-559.
Abdulghani et al., "Preparation and Characterization of Di-, Tri-, and Tetranuclear Schiff Base Complexes Derived from Diamines and 3,4-Dihydroxybenzaldehyde," Hindawi Publishing Corp, Bioinorganic Chemistry and Applications, 2013, pp. 1-14.
IUPAC Compendium of Chemical Terminology, "coordinatively unsaturated complex," 1997, http://old.iupac.org/goldbook/C01334.pdf.
Mansoor, "Mixed Metal Complexes of Copper (II), Nickel (II) and Zinc (II) Involving Dopa and Dopamine," International Journal of ChemTech Research, Jan.-Mar. 2010, vol. 2, No. 1, pp. 640-645.
International Search Report and Written Opinion from PCT/US17/14764, dated Apr. 20, 2017.
International Search Report and Written Opinion from PCT/US16/69190, dated May 3, 2017.
International Search Report and Written Opinion from PCT/US2017/022203, dated Jun. 6, 2017.
International Search Report and Written Opinion from PCT/US17/43393, dated Oct. 5, 2017, 7 pages.
Ahluwalia et al., Intermediates for Organic Synthesis, Chapter 1, Phenols, Sections 1.21 and 1.23, (2003), I.K. International Pvt. Ltd.
Ahn et al., "A Study of Benzene 1,2,4-Trisphosphate Derivatives as Inositol 1,4,5-Trisphosphate 3-Kinase Inhibitors," Bull. Korean Chem. Soc., 2002, pp. 515-517, vol. 23., No. 3.
Borgias, "Synthetic, structural, and physical studies of titanium complexes of catechol and 3,5-di-tert-butylcatechol," Inorg. Chem., Apr. 1984, 23(8), 1009-1016.
Bosch et al., "Novel Catalysis of Hydroquinone Autoxidation with Nitrogen Oxides," J. Org. Chem., 1994, pp. 2529-2536, 59.
Brezina, "Study of the reduction of oxygen on a carbon paste electrode in an alkaline medium," Coll. Czech. Chem. Commun., 1973, 38(10), 3024-3031.
Caulton, "Systematics and Future Projections Concerning Redox-Noninnocent Amide/Imine Ligands," Eur. J. Inorg. Chem., Jan. 2012, 2012(3), 435-443.
Cerofontain et al. "Sulfonation and sulfation on reaction of 1,2-dihydroxybenzene and its methyl ethers in concentrated aqueous sulfuric acid," Recl Trav Chim Pays-Bas, 1988, pp. 325-330, vol. 107.
Chen, "Solution Redox Couples for Electrochemical Energy Storage: I. Iron (III)-Iron (II) Complexes with O-Phenanthroline and Related Ligands," Journal of the Electrochemical Society, Jul. 1981, 128(7), 1460-1467.
Cohen, "The Association of Ferrocyanide Ions With Various Cations," J. Phys. Chem., Aug. 1957, 61(8), 1096-1100.
Davies, "Electroceramics from Source Materials via Molecular Intermediates: PbTiO3 from TiO2 via [Ti(catecholate)3]2-," J. Am. Ceram. Soc., Aug. 1990, 73(8), 2570-2572.
Davies, "Electroceramics from Source Materials via Molecular Intermediates: BaTIO3 from TIO2 via [TI(catecholate)3]2-," May 1990, J. Am. Ceram. Soc., Aug. 1990, 73(5), 1429-30.
Dehaen et al, "A Self-Assembled Complex with a Titanium (IV) Catecholate Core as a Potential Bimodal Contrast Agent," Chem Eur J, 2012, pp. 293-302, vol. 18.
Fryda, "Wastewater Treatment With Diamond Electrodes," Diamond Materials, Electrochemical Society Proceedings, 2000, 99(32), 473-483.
Gail, "Cyano Compounds, Inorganic" in Ullmann's Encyclopedia of Industrial Chemistry, 2012, 10, 674-710.
Hollandsworth, "Zinc/Ferrocyanide Battery Development Phase IV" Lockheed Missiles and Space Company, Inc., Contractor report, Sandia Contract DE-AC04-76DP00789, May 1985, 278 pages.
Kim, "Novel catalytic effects of Mn3O4 for all vanadium redox flow batteries," Chem. Commun., Apr. 2012, 48(44), 5455-5457.
Kulesza, "Electrochemical preparation and characterization of hybrid films composed of Prussian blue type metal hexacyanoferrate and conducting polymer," Electrochimica Acta, Aug. 2001, 46(26-27), 4065-4073.
Lang et al., "Studies on the Biosynthesis of Bovilactone-4,4 and Related Fungal Meroterpenoids," Eur. J. Org. Chem., 2008, pp. 3544-3551.
Lang et al., "Studies on the Structure and Biosynthesis of Tridentoquinone and Related Meroterpenoids from the Mushroom *Suillus tridentinus* (Boletales)," Eur. J. Org. Chem., 2008, pp. 816-825.

(56) References Cited

OTHER PUBLICATIONS

Leung, "An undivided zinc—cerium redox flow battery operating at room temperature (295 K)," Electrochemistry Communications, 2011, vol. 13, pp. 770-773.
Leung, "Ce(III)/CE(iV) in methanesulfonic acid as the positive half cell of a redox flow battery," Electrochimica Acta, 2011, vol. 56, pp. 2145-2153.
Leung, "Characterization of a zinc—cerium flow battery," Journal of Power Sources, 2011, vol. 195, pp. 5174-5185.
Leung, "Development of a Zinc—Cerium Redox Flow Battery", 2011, 352 pages.
Leung, "Zinc deposition and dissolution in methanesulfonic acid onto a carbon composite electrode as the negative electrode reactions in a hybrid redox flow battery," Electrochimica Acta, 2011, vol. 56, pp. 6536-6546.
Maison, et al., "Effect of Calcination Temperature on Phase Transformation and Particle size of Barium Titanate Fine Powders Synthesized by the Catecholate Process," ScienceAsia, 2001, pp. 239-243, 27.
McOmie et al. "The Thiele-Winter Acetoxylation of Quinones," Organic Reactions, 1972, pp. 199-277, 19, John Wiley and Sons, Inc., New York.
Modiba, "Electrochemical impedance spectroscopy study of Ce(IV) with aminopolycarboxylate ligands for redox flow batteries applications," Journal of Power Sources, May 2012, vol. 205, 1-9.
Modiba, "Electrochemical study of cerium(IV) in the presence of ethylenediaminetetraacetic acid (EDTA) and diethylenetriaminepentaacetate (DTPA) ligands," Journal of Applied Electrochemistry, Sep. 2008, 38(9), 1293-1299.
Modiba, "Electrolytes for redox flow battery systems," Dissertation presented for the degree of Doctor of Philosophy Chemistry at the University of Stellenbosch, Department of Chemistry and Polymer Science, Mar. 2010.
Murakami et al., "The Chelating Behavior of Catechol-4-sulfonate with Iron(III) Ion," Bulletin of the Chemical Society of Japan, 1963, pp. 1408-1411; vol. 36.
Nguyen, "Flow Batteries," The Electrochemical Society Interface, Fall2010, 19(3), 54-56.
Pharr, "Infrared Spectroelectrochemical Analysis of Adsorbed Hexacyanoferrate Species Formed during Potential Cycling in the Ferrocyanide/Ferricyanide Redox Couple," Anal. Chem., Nov. 1997, 69(22), 4673-4679.
Raymond, "Coordination isomers of biological iron transport compounds. VI. Models of the enterobactin coordination site. A crystal field effect in the structure of potassium tris( catecholato )chromate( III) and -ferrate( III) sesq u ihyd rates, K3[M( 02C6H4 )3]. 1 . 5H20, M=chromium, iron," J. Am. Chem. Soc., Mar. 1976, 98(7), 1767-1774.
Saito et al. "DPPH radical-scavenging reaction of protocatechuic acid: differnce in reactivity between acids and their esters," Hely Chim Acta, 2006, pp. 1395-1407, vol. 89.
Sever et al, "Visible absorption spectra of metal-catecholate and metal-tironate complexes," Dalton Trans., pp. 1061-1072, 2004.
Sigma-Aldrich Tris(hydroxymethyl)aminomethane, 2015.
Soloveichik, "Flow Batteries: Current Status and Trends," 2015, Chem. Rev., 115 (20), pp. 11533-11558.
Sommer, "Titanium (IV) complexes with ligands having oxygen donor atoms in aqueous solutions," Zeitschrift fur Anorganische und Aligemeine Chemie, Mar. 1963, pp. 191-197, vol. 321, issue 3-4.
Spyroudis, "Hydroxyquinones: Synthesis and Reactivity," Molecules, 2000, pp. 1291-1330, 5.
Steenken, "One-electron redox potentials of phenols. Hydroxy- and aminophenols and related compounds of biological interest," J. Phys. Chem., Sep. 1982, 86(18), 3661-3667.
Torres-Gomez, "Energy Storage in Hybrid Organic-Inorganic Materials Hexacyanoferrate-Doped Polypyrrole as Cathode in Reversible Lithium Cells," J. of the Electrochemical Society, 2000, 147(7), 2513-2516.
Trant, "Solubility of Sodium Ferrocyanide and Potassium Ferrocyanide in Solutions of NaOH and KOH Mixtures at 25.degree. C," University of Rochester, The David T. Kearns Center, Xerox Undergraduate Research Fellows Program, Jul. 28, 2011, 1 page.
Vercillo, "Solubility of Sodium Ferrocyanide in Sodium Hydroxide and Potassium Ferrocyanide in Potassium Hydroxide," University of Rochester, The David T. Kearns Center, Xerox Undergraduate Research Fellows Program, Jul. 28, 2011, 1 page.
Wang, "Determination of iron, titanium, osmium, and aluminum with tiron by reversephase high performance liquid chromatography/electrochemistry," Microchem. J., Jun. 1991, 43(3), 191-197.
Weber, "Redox flow batteries: a review," Journal of Applied Electrochemistry, Oct. 2011, 41(10), 1137-1164.
Westervelt, "A Study of the Calcium Complex of the Potassium Salt of Catechol-4-Sulfonate in Aqueous, Alkalino Media," Jan. 1981, Doctoral Dissertation, retrieved from https://smartech.gatech.edu/bitstream/handle/1853/5723/westervelt-iii_hh.pdf.
Ali et al., "Synthesis and Processing Characteristics of $Ba_{0.65}Sr_{0.35}TiO_3$ Powders from Catecholate Precursors," J Am Ceram Soc, 1993, pp. 2321-2326, vol. 76, No. 9.
Devi et al., "pH-metric investigation on Mixed-Ligand Complexes of Ca(II), Mg(II) and Zn(II) with L-Dopa and 1,10 Phenantroline in Propylene glycol-Water Mixtures," RRJC, Oct.-Dec. 2012, vol. 1, Issue 1, pp. 13-22.
Xu, "Mechanics of metal-catecholate complexes: The roles of coordination state and metal types," Scientific Reports, Oct. 10, 2013, 3:2914, pp. 1-7.
Extended European Search Report from European Patent Application No. 15863021, dated May 17, 2018, 11 pages.
Chi et al., "Structural characterization of Sr—Ti and Ba—Ti catecholate complexes: single source precursors fro SrTiO3 and BaTiO3 binary oxides," Journal of Physics and Chemistry of Solids, 2001, vol. 62, pp. 1871-1879.

\* cited by examiner

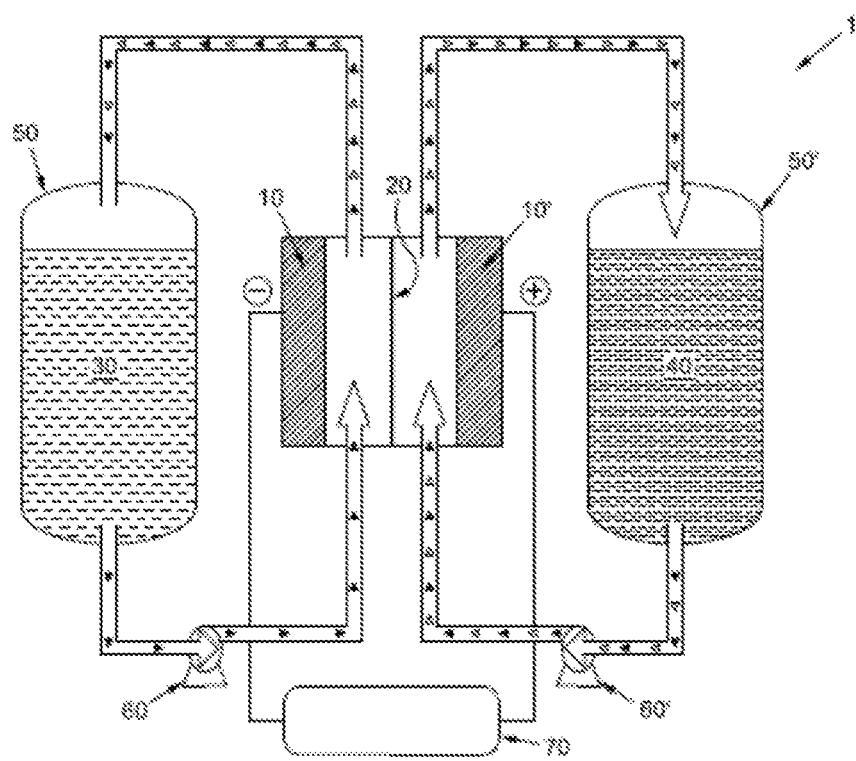

FLOW BATTERIES INCORPORATING ACTIVE MATERIALS CONTAINING DOUBLY BRIDGED AROMATIC GROUPS

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to energy storage and, more specifically, to flow batteries and other electrochemical systems including active materials containing doubly bridged aromatic compounds.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The terms "membrane" and "separator" are used synonymously herein. The flow battery is charged or discharged through electrochemical reactions of the active materials that occur inside the two half-cells. As used herein, the terms "active material," "electroactive material," "redox-active material" or variants thereof synonymously refer to materials that undergo a change in oxidation state during operation of a flow battery or like electrochemical energy storage system (i.e., during charging or discharging).

Although flow batteries hold significant promise for large-scale energy storage applications, they have historically been plagued by sub-optimal energy storage performance (e.g., round trip energy efficiency) and limited cycle life, among other factors. Despite significant investigational efforts, no commercially viable flow battery technologies have yet been developed.

Some active materials can be organic compounds that are capable of undergoing a reversible oxidation-reduction cycle. Organic active materials sometimes provide relatively limited energy densities due to low solubility values, particularly in aqueous electrolyte solutions, and low conductivity values. To compensate for low solubility values, organic active materials are frequently used in non-aqueous electrolyte solutions so that increased solubility can be realized. High synthesis costs and environmental issues can sometimes accompany the use of organic active materials in flow batteries.

Metal-based active materials can often be desirable for use in flow batteries and other electrochemical energy storage systems. Although non-ligated metal ions (e.g., dissolved salts of a redox-active metal) can be used as an active material, it can often be more desirable to utilize coordination compounds for this purpose. As used herein, the terms "coordination complex," "coordination compound," and "metal-ligand complex" synonymously refer to a compound having at least one covalent bond formed between a metal center and a donor ligand. In many cases, the metal center can cycle between an oxidized form and a reduced form in an electrolyte solution, with the donor ligand being a spectator to the oxidation-reduction process. The oxidized and reduced forms of the metal center represent states of full charge or full discharge depending upon the particular half-cell in which the coordination compound is present. Because the oxidation-reduction cycle of many coordination compounds involves the transfer of only one electron at the metal center (i.e., a change in metal oxidation state of +1 or −1), the amount of charge that can be stored per molecule of coordination compound can frequently lead to low energy densities. Limited solubility of some coordination compounds can likewise detrimentally impact energy density values, particularly in aqueous electrolyte solutions. In addition, limited solubility of an active material can increase the risk of unwanted and damaging precipitation taking place during operation of a flow battery.

In view of the foregoing, active materials capable of providing enhanced energy density and/or improved stability in flow batteries would be highly desirable in the art. The present disclosure satisfies the foregoing need and provides related advantages as well.

SUMMARY

In some embodiments, the present disclosure provides flow batteries including a first half-cell containing a first electrolyte solution, and a second half-cell containing a second electrolyte solution. At least one of the first electrolyte solution and the second electrolyte solution contains an active material having at least two aromatic groups doubly bridged by a carbonyl moiety and a bridging moiety containing a bridging atom selected from the group consisting of carbon, nitrogen, oxygen, sulfur, selenium and tellurium.

In other various embodiments, the present disclosure provides flow batteries and compositions containing a coordination compound having at least one ligand that is a bridged compound having a structure of

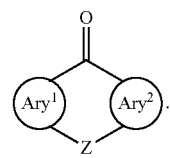

or a salt thereof. $Ary^1$ and $Ary^2$ are independently selected from the group consisting of an unsubstituted aromatic ring, an unsubstituted heteroaromatic ring, a substituted aromatic ring, and a substituted heteroaromatic ring. Z is selected from the group consisting of $CR^1R^2$, $NR^8$, $NR^8R^{8'}$, O, S, $S(=O)$, $S(=O)_2$, Se, $Se(=O)$, $Se(=O)_2$, Te, $Te(=O)$, and $Te(=O)_2$. $R^1$ and $R^2$ are independently selected from the group consisting of H; optionally substituted alkyl, alkenyl, alkynyl, aryl, aralkyl, heterocyclyl, or heteroaryl; $C_2$-$C_6$ polyol; $OR^3$; $SR^3$; $S(=O)R^3$; $S(=O)_2R^3$; $NR^9R^{10}$; $CH_2(OCH_2CH_2)_xOCH_3$; $C(=O)R^4$; halogen; cyano; and perfluoroalkyl. $R^3$ is selected from the group consisting of H; optionally substituted alkyl, alkenyl, alkynyl, aryl, aralkyl, heterocyclyl, or heteroaryl; $(CH_2CH_2O)_xCH_3$; $C(=O)NR^5R^6$; $C(=O)R^7$; and perfluoroalkyl. $R^5$ and $R^6$ are independently selected from the group consisting of H; optionally substituted alkyl, alkenyl, alkynyl, aryl, aralkyl, heterocyclyl, or heteroaryl; $(CH_2CH_2O)_xCH_3$; $CH_2(OCH_2CH_2)_xOCH_3$; and perfluoroalkyl. $R^7$ is selected from the group consisting of H; OH; optionally substituted alkyl, alkenyl, alkynyl, aryl, aralkyl, heterocyclyl, or heteroaryl; and perfluoroalkyl. $R^4$ is selected from the group consisting of $R^5$, $OR^5$, and $NR^5R^6$. $R^8$ and $R^{8'}$ are independently selected from the group consisting of H; optionally substituted alkyl, alkenyl, alkynyl, aryl, aralkyl, heterocyclyl, or heteroaryl; $(CH_2CH_2O)_xCH_3$; $CH_2(OCH_2CH_2)_xOCH_3$; perfluoroalkyl; $C(=O)R^5$; $C(=O)OR^5$; and $C(=O)NR^5R^6$. $R^9$ and $R^{10}$ are independently selected from the group consisting of H; optionally substituted alkyl, alkenyl, alkynyl, aryl, aralkyl, heterocyclyl, or heteroaryl; $(CH_2CH_2O)_xCH_3$; $CH_2(OCH_2CH_2)_xOCH_3$; $C(=O)R^4$; and perfluoroalkyl. Variable x is an integer ranging between 0 and about 100.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 1 depicts a schematic of an illustrative flow battery.

DETAILED DESCRIPTION

The present disclosure is directed, in part, to flow batteries incorporating at least one active material containing a doubly bridged aromatic compound. The present disclosure is also directed, in part, to compositions containing coordination compounds with at least one ligand that includes at least two aromatic groups that are doubly bridged by a carbonyl moiety and a second bridging moiety.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that can be operated on a large scale while maintaining high operating efficiencies and energy densities can be extremely desirable. Flow batteries have generated significant interest in this regard, but there remains considerable room for improving their performance. In particular, a low ratio of electrons transferred per molecule of active material can be limiting in some instances. Low solubility and poor stability of some active materials can also be problematic. Exemplary description of illustrative flow batteries, their use, and operating characteristics is provided hereinbelow.

The present inventors identified a broad class of active materials suitable for use in flow batteries in a variety of forms. The active materials described herein contain multiple aromatic groups that are capable of transporting at least one electron per molecule during an oxidation-reduction cycle. In particular, the active materials identified by the inventors contain two or more aromatic and/or heteroaromatic groups that are doubly bridged by a first bridging moiety and a second bridging moiety, in which the first bridging moiety is a carbonyl group and the second bridging moiety contains a bridging atom selected from the group consisting of carbon, nitrogen, oxygen, sulfur, selenium and tellurium. Collectively, the aromatic/heteroaromatic groups and the bridging moieties define a six-membered ring fused between the aromatic/heteroaromatic groups. Suitable second bridging moieties include, for example, substituted or unsubstituted methylene, amine, amide, urea, carbamate, ether, thioether, sulfoxide, or sulfone groups. More particular examples are discussed in further detail hereinbelow.

The bridged compounds identified by the inventors possess a number of advantages for use in conjunction with flow batteries. First, bridged compounds of the type discussed herein can be readily synthesized by various synthetic routes. Acridone, for example, can be synthesized by ring closure of N-phenylanthranilic acid or by condensing anthranilic acid and aniline. The synthetic routes further allow other types of additional functionalization to be introduced, either on the second bridging moiety or on one or both of the at least two aromatic groups. Second, the bridged compounds can directly serve as active materials in their free (uncomplexed) form, or they can be bonded to a metal center in a coordination compound. In some instances, additional functionality capable of promoting complexation of a metal ion can be introduced into the bridged compounds to allow complexation to take place. Third, the bridged compounds discussed herein are stable under a variety of conditions that are commonly present in electrolyte solutions and have oxidation-reduction potentials that are in a convenient range for use in flow batteries. For example, 2-nitroacridone has a reduction potential of +0.07 V vs. Ag/AgCl at pH=7.4, and 1,3,6,7-tetrahydroxyxanthone has a reduction potential of +0.45 vs. Ag/AgCl at pH=7.4. The oxidation-reduction potentials can be further tailored through judicious choice of any additional functionality introduced to the bridged compounds. Finally, the bridged compounds themselves exhibit reasonably good solubility values by virtue of their backbone heteroatoms. Additional functionality can also promote even greater solubility of the bridged compounds or their coordination compounds in some instances, thereby allowing high-concentration electrolyte solutions to be prepared. In some instances, additional functionalization can tailor the solubility of the bridged compounds or their coordination compounds to favor dissolution in an aqueous or an organic electrolyte solution.

As mentioned above, the bridged compounds discussed herein can be used directly as active materials (i.e., in a free or unbound form), or the bridged compounds can be complexed with a metal center to form a coordination compound. Even when used directly in an uncomplexed form, the bridged compounds can advantageously transfer at least one electron per molecule during an oxidation-reduction cycle. When complexed to a redox-active metal center, an even greater number of electrons can be transferred on a molar basis, since both the metal-center and the ligand(s) can undergo oxidation and reduction. Thus, in either form, the bridged compounds of the present disclosure allow increased energy density values to be realized.

Accordingly, the present inventors discovered that the energy density and performance of existing flow battery designs can be improved by incorporating the bridged compounds discussed herein in an appropriate form within at least one of the flow battery's half-cells. Depending upon the needs of a particular application, the appropriate form can be either the unbound form of the bridged compounds or a coordination compound containing the bridged compounds as at least one ligand. In more particular embodiments, the bridged compounds and their corresponding coordination compounds are believed to be especially applicable within the negative half-cell of flow batteries.

Alternately, the bridged compounds discussed herein and their corresponding coordination compounds can allow lower-concentration electrolyte solutions to be utilized while still preserving comparable energy density values to those found in existing flow batteries. Lower-concentration electrolyte solutions can be particularly desirable for discouraging unwanted precipitation of the active materials during operation of a flow battery. Thus, by utilizing the bridged compounds of the present disclosure, the reliability of flow batteries can be improved by utilizing electrolyte solutions that contain an active material at a concentration further removed from the saturation concentration. Furthermore, lower-concentration electrolyte solutions can be desirable from the standpoints of reduced cost of materials and decreased pumping losses during operation.

The various embodiments of flow batteries and compositions described herein incorporate a bridged compound having at least two aromatic groups that are doubly bridged by a carbonyl moiety and a bridging moiety containing a bridging atom selected from the group consisting of carbon, nitrogen, oxygen, sulfur, selenium and tellurium. The first four types of bridging atoms can be especially suitable. Additional details follow hereinafter.

In more particular embodiments, the bridging moiety can be a substituted or unsubstituted methylene group, substituted or unsubstituted amine group or amine group salt, substituted or unsubstituted amide group, substituted or unsubstituted urea group, substituted or unsubstituted carbamate group, ether group, thioether group, sulfoxide group, or sulfoxide group. For the bridging moieties that are capable of bearing further substitution, the substitution can serve a number of purposes including, for example, introducing groups capable of complexing a metal ion, changing solubility properties of the bridged compound or its coordination compounds, changing oxidation-reduction properties, and any combination thereof. More specific examples of suitable bridging compounds are discussed hereinbelow.

In some embodiments, the at least two aromatic groups can be an unsubstituted or substituted benzene ring, naphthyl ring, pyridine ring, pyrazine ring, pyrimidine ring, triazine ring, quinolone ring, isoquinoline ring, phthalazine ring, quinazoline ring, quinoxaline ring, thiophene ring, benzothiophene ring, pyrrole ring, indole ring, isoindole ring, pyrazole ring, indazole ring, imidazole ring, benzimidazole ring, triazole ring, benzotriazole ring, oxazole ring, benzoxazole ring, isoxazole ring, benzisoxazole ring, thiazole ring, benzothiazole ring, isothiazole ring, benzisothiazole ring, furan ring, benzofuran ring, and isobenzofuran ring. The at least two aromatic groups can be the same or different, and the at least two aromatic rings can both be unsubstituted or substituted, and bear the same or different substitution(s). Further, the substitution on the aromatic groups can be in any pattern and can serve any desired purpose (e.g., promoting metal ion complexation or solubility, like the additional functionality that can be located on the bridging moiety).

Accordingly, in some embodiments, the present disclosure provides flow batteries containing a first half-cell containing a first electrolyte solution, and a second half-cell containing a second electrolyte solution, wherein at least one of the first electrolyte solution and the second electrolyte solution contains an active material having at least two aromatic groups doubly bridged by a carbonyl moiety and a bridging moiety containing a bridging atom selected from the group consisting of carbon, nitrogen, oxygen, sulfur, selenium and tellurium. More specific discussion of such bridged compounds follows hereinbelow. Before discussing further specifics of the bridged compounds and their corresponding coordination compounds, a brief discussion of flow batteries and their operating characteristics will first be described so that the advancements of the present disclosure can be better understood.

Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks through an electrochemical stack containing one or more electrochemical cells. This design feature decouples the electrical energy storage system power from the energy storage capacity, thereby allowing for considerable design flexibility and cost optimization. FIG. 1 shows a schematic of an illustrative flow battery containing a single electrochemical cell. Although FIG. 1 shows a flow battery containing a single electrochemical cell, approaches for combining multiple electrochemical cells together are known and are discussed hereinbelow.

As shown in FIG. 1, flow battery 1 includes an electrochemical cell that features separator 20 between electrodes 10 and 10' of the electrochemical cell. As used herein, the terms "separator" and "membrane" synonymously refer to an ionically conductive and electrically insulating material disposed between the positive and negative electrodes of an electrochemical cell. Electrodes 10 and 10' are formed from a suitably conductive material, such as a metal, carbon, graphite, and the like, and the materials for two can be the same or different. Although FIG. 1 has shown electrodes 10 and 10' as being spaced apart from separator 20, electrodes 10 and 10' can also be abutted with separator 20 in more particular embodiments. The material(s) forming electrodes 10 and 10' can be porous, such that they have a high surface area for contacting the electrolyte solutions containing first active material 30 and second active material 40, which are capable of being cycled between an oxidized state and a reduced state. For example, one or both of electrodes 10 and 10' can be formed from a porous carbon cloth or a carbon foam in some embodiments.

Pump 60 affects transport of first active material 30 from tank 50 to the electrochemical cell. The flow battery also suitably includes second tank 50' that contains second active material 40. Second active material 40 can be the same material as first active material 30, or it can be different. Second pump 60' can affect transport of second active material 40 to the electrochemical cell. Pumps (not shown in FIG. 1) can also be used to affect transport of first and second electrolyte solutions 30 and 40 from the electrochemical cell back to first and second electrolyte reservoirs 50 and 50'. Other methods of affecting fluid transport, such as siphons, for example, can also suitably transport first and second electrolyte solutions 30 and 40 into and out of the electrochemical cell. Also shown in FIG. 1 is power source or load 70, which completes the circuit of the electrochemical cell and allows a user to collect or store electricity during its operation. Connection to the electrical grid can also occur at this location.

It should be understood that FIG. 1 depicts a specific, non-limiting configuration of a particular flow battery. Accordingly, flow batteries consistent with the spirit of the present disclosure can differ in various aspects relative to the configuration of FIG. 1. As one example, a flow battery can include one or more active materials that are solids, gases, and/or gases dissolved in liquids. Active materials can be stored in a tank, in a vessel open to the atmosphere, or simply vented to the atmosphere.

As indicated above, multiple electrochemical cells can also be combined with one another in an electrochemical stack in order to increase the rate that energy can be stored and released during operation. The amount of energy released is determined by the overall amount of active material that is present. An electrochemical stack utilizes bipolar plates between adjacent electrochemical cells to establish electrical communication but not fluid communication between the two cells across the bipolar plate. Thus, bipolar plates contain the electrolyte solutions within the individual electrochemical cells. Bipolar plates are generally fabricated from electrically conductive materials that are fluidically non-conductive on the whole. Suitable materials can include carbon, graphite, metal, or a combination thereof. Bipolar plates can also be fabricated from non-conducting polymers having a conductive material dispersed therein, such as carbon particles or fibers, metal particles or fibers, graphene, and/or carbon nanotubes. Although bipolar plates can be fabricated from the same types of conductive materials as can the electrodes of an electrochemical cell, they can lack the continuous porosity permitting an electrolyte solution to flow completely through the latter. It should be recognized that bipolar plates are not necessarily entirely non-porous entities, however. Bipolar plates can have innate or designed flow channels that provide a greater surface area for allowing an electrolyte solution to contact the bipolar plate. Suitable flow channel configurations can include, for example, interdigitated flow channels. In some embodiments, the flow channels can be used to promote delivery of an electrolyte solution to an electrode within the electrochemical cell.

In some instances, an electrolyte solution can be delivered to and withdrawn from each electrochemical cell via a fluid inlet manifold and a fluid outlet manifold (not shown in FIG. 1). In some embodiments, the fluid inlet manifold and the fluid outlet manifold can provide and withdraw an electrolyte solution via the bipolar plates separating adjacent electrochemical cells. Separate manifolds can provide each electrolyte solution to the two half-cells of each electrochemical cell. In more particular embodiments, the fluid inlet manifold and the fluid outlet manifold can be configured to supply and withdraw the electrolyte solutions via opposing lateral faces of the bipolar plates.

In more specific embodiments, at least one of the active materials in the flow batteries described herein can be a bridged compound having Structure 1.

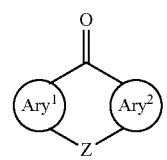

Structure 1

The active material can be the bridged compound of Structure 1, a coordination compound thereof, or a salt thereof. More specific disclosure regarding suitable coordination compounds is provided hereinbelow.

In Formula 1, $Ary^1$ and $Ary^2$ are aromatic or heteroaromatic rings that are independently selected from among an unsubstituted aromatic ring, a substituted aromatic ring, an unsubstituted heteroaromatic ring, and a substituted aromatic ring. $Ary^1$ and $Ary^2$ can incorporate same or different aromatic ring and/or heteroaromatic ring, and the substitution pattern on each can be the same or different. In more specific embodiments, Ary$^1$ and Ary$^2$ can be independently selected from the group consisting of a substituted or unsubstituted benzene ring, naphthyl ring, pyridine ring, pyrazine ring, pyrimidine ring, triazine ring, quinolone ring, isoquinoline ring, phthalazine ring, quinazoline ring, quinoxaline ring, thiophene ring, benzothiophene ring, pyrrole ring, indole ring, isoindole ring, pyrazole ring, indazole ring, imidazole ring, benzimidazole ring, triazole ring, benzotriazole ring, oxazole ring, benzoxazole ring, isoxazole ring, benzisoxazole ring, thiazole ring, benzothiazole ring, isothiazole ring, benzisothiazole ring, furan ring, benzofuran ring, and isobenzofuran ring.

In still more specific embodiments, the bridged compound can have the structure shown in Structure 2, in which Ary$^1$ and Ary$^2$ are independently an unsubstituted or substituted phenyl ring, wherein X$^1$ and X$^2$ are optional independent substitution that can be present on Ary$^1$ and Ary$^2$ and n and m are integers independently ranging between 0 and 4. More specific examples of optional substitution that can be present on Ary$^1$ and Ary$^2$ are provided hereinbelow.

Structure 2

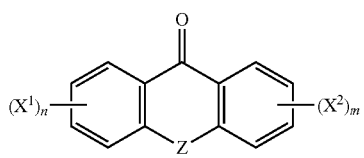

Referring again to Structures 1 and 2, Z can be selected from the group consisting of CR$^1$R$^2$, NR$^8$, NR$^8$R$^{8'}$, O, S, S(=O), S(=O)$_2$, Se, Se(=O), Se(=O)$_2$, Te, Te(=O), and Te(=O)$_2$, wherein R$^1$, R$^2$, R$^8$ and R$^{8'}$ are defined hereinafter. In more specific embodiments, Z can be CR$^1$R$^2$, NR$^8$, O, S, S(=O) or S(=O)$_2$. In still more specific embodiments, Z can be NR$^8$, O or S; or NR$^8$, O, S, S(=O), or S(=O)$_2$. In the case of Z being NR$^8$, O or S, the bridged compounds are known by the common names acridone, xanthone and thioxanthone. Although the base ring systems are known, these types of bridged compounds are not believed to have been previously incorporated into flow batteries.

As used herein, the term "alkyl" refers to a straight-chain, branched or cyclic carbon chain containing 1 to about 16 carbon atoms and no carbon-carbon unsaturation. As used herein, the term "carbon-carbon unsaturation" refers to a carbon-carbon double bond or triple bond.

As used herein, the term "alkenyl" refers to a straight-chain, branched or cyclic carbon chain containing 2 to about 16 carbon atoms and at least one carbon-carbon double bond. The at least one carbon-carbon double bond can be in any location in the carbon chain and in either the E or Z configuration.

As used herein, the term "alkynyl" refers to a straight-chain, branched or cyclic carbon chain containing 2 to about 16 carbon atoms and at least one carbon-carbon triple bond. The at least one carbon-carbon triple bond can be in any location in the carbon chain.

As used herein, the term "aryl" refers to a monocyclic or polycyclic aromatic group containing 6 to about 19 carbon atoms.

As used herein, the term "heteroaryl" refers to a monocylic or polycyclic aromatic group containing 5 to about 18 carbon atoms and at least one heteroatom within at least one of the aromatic groups. More specifically, the at least one heteroatom in a heteroaryl group can be O, N or S.

As used herein, the term "heterocyclyl" refers to a monocyclic or polycyclic group containing 3 to about 10 carbon atoms that is non-aromatic and contains at least one heteroatom within at least one ring.

As used herein, the term "aralkyl" refers an alkyl group in which at least one hydrogen atom has been replaced by an aryl or heteroaryl group.

As used herein, the term "polyol" refers to any compound having two or more alcohol functional groups. Additional heteroatom functionality, such as amines and carboxylic acids, can optionally be present within a polyol. Thus, amino alcohol and hydroxy acid analogues of unmodified glycols and higher polyols are also encompassed by the term "polyol." Some illustrative polyols can include monosaccharides. As used herein, term "monosaccharide" refers to both the base monosaccharide and the corresponding sugar alcohols, sugar acids, and deoxy sugars of the base monosaccharide, including any open- or closed-chain forms of these materials. Illustrative polyols include, for example, 1,2-ethanediol (ethylene glycol), 1,2-propanediol (propylene glycol), 1,3-propanediol, 1,2-butanediol, 1,4-butanediol, glycerol, erythritol, threitol, arabitol, xylitol, ribitol, mannitol, sorbitol, galacitol, fucitol, iditol, inositol, glycolaldehyde, glyceraldehyde, 1,3-dihydroxyacetone, erythrose, threose, erythrulose, arabinose, ribose, lyxose, xylose, ribulose, xylulose, allose, altrose, glucose, mannose, gulose, idose, galactose, talose, psicose, fructose, sorbose, tagatose, deoxyribose, rhamnose, fucose, glyceric acid, xylonic acid, gluconic acid, ascorbic acid, glucuronic acid, galacturonic acid, iduronic acid, tartartic acid, galactaric acid, and glucaric acid.

As used herein, the term "perfluoroalkyl" refers to an alkyl group that has at least 50% of its hydrogen atoms replaced by fluoro groups. In some embodiments, at least about 90% of the hydrogen atoms are replaced by fluoro groups, and in some embodiments, all of the hydrogen atoms are replaced by fluoro groups.

As used herein, the term "optionally substituted" refers to an alkyl, alkenyl, alkynyl, aryl, aralkyl, heterocyclyl, or heteroaryl group being either unsubstituted or bearing at least one heteroatom substituent. As used herein, the term "heteroatom substituent" refers to a functional group containing one or more O, N or S atoms, or a halogen atom. As used herein, the term "halogen" refers to F, Cl, Br or I. Illustrative heteroatom substituents that can optionally be present include, but are not limited to, hydroxyl, alkoxy, cyano, nitro, carboxyl, carboxamide, carboxylic ester, carbonyl, amine, ether, sulfonyl, fluoro, chloro, bromo, iodo, and trihaloalkyl. In the case of a carbon chain, the at least one heteroatom substituent can either be appended from the carbon chain and/or replace one or more of the carbon atoms within the carbon chain. In the case of a heterocyclic or heteroaromatic ring, the at least one heteroatom substituent can be appended from the heterocyclic or heteroaromatic ring.

In Structures 1 and 2, R$^1$ and R$^2$ are independently selected from the group consisting of H; optionally substituted alkyl, alkenyl, alkynyl, aryl, aralkyl, heterocyclyl, or heteroaryl; C$_2$-C$_6$ polyol; OR$^3$; SR$^3$; S(=O)R$^3$; S(=O)$_2$R$^3$; NR$^9$R$^{10}$; CH$_2$(OCH$_2$CH$_2$)$_x$OCH$_3$; C(=O)R$^4$; halogen; cyano; and perfluoroalkyl. In some embodiments, R$^1$ and R$^2$ can constitute a single alkylene or substituted alkylene moiety forming a spiro ring terminating at the bridging carbon atom of the bridged compound. Thus, a wide range of substituents can be present on a methylene bridging moiety between the at least two aromatic rings. The substituents can be selected to affect the oxidation-reduction potential of the bridged compound, to promote complexation of a metal ion, and/or to promote solubility in a desired solvent, such as an aqueous electrolyte solution.

$R^3$ is selected from the group consisting of H; optionally substituted alkyl, alkenyl, alkynyl, aryl, aralkyl, heterocyclyl, or heteroaryl; $(CH_2CH_2O)_xCH_3$; $C(=O)NR^5R^6$; $C(=O)R^7$; and perfluoroalkyl.

$R^5$ and $R^6$ are independently selected from the group consisting of H; optionally substituted alkyl, alkenyl, alkynyl, aryl, aralkyl, heterocyclyl, or heteroaryl; $(CH_2CH_2O)_xCH_3$; $CH_2(OCH_2CH_2)_xOCH_3$; and perfluoroalkyl.

$R^7$ is selected from the group consisting of H; OH; optionally substituted alkyl, alkenyl, alkynyl, aryl, alkaryl, aralkyl, heterocyclyl, or heteroaryl; and perfluoroalkyl.

$R^4$ is selected from the group consisting of $R^5$, $OR^5$, and $NR^5R^6$.

$R^8$ and $R^{8'}$ are independently selected from the group consisting of H; optionally substituted alkyl, alkenyl, alkynyl, aryl, aralkyl, heterocyclyl, or heteroaryl; $(CH_2CH_2O)_xCH_3$; $CH_2(OCH_2CH_2)_xOCH_3$; perfluoroalkyl; $C(=O)R^5$; $C(=O)OR^5$; and $C(=O)NR^5R^6$.

$R^9$ and $R^{10}$ are independently selected from the group consisting of H; optionally substituted alkyl, alkenyl, alkynyl, aryl, alkaryl, aralkyl, heterocyclyl, or heteroaryl; $(CH_2CH_2O)_xCH_3$; $CH_2(OCH_2CH_2)_xOCH_3$; $C(=O)R^4$; and perfluoroalkyl.

In the above definitions, x is an integer ranging between 1 and about 100. In some more specific embodiments, x can range between 1 and about 10 or between 1 and about 5.

As shown above in Structure 2, $Ary^1$ and $Ary^2$ can both be a phenyl group in some embodiments. More generally, however, $Ary^1$ and $Ary^2$ can be independently selected from among a substituted or unsubstituted benzene ring, naphthyl ring, pyridine ring, pyrazine ring, pyrimidine ring, triazine ring, quinolone ring, isoquinoline ring, phthalazine ring, quinazoline ring, quinoxaline ring, thiophene ring, benzothiophene ring, pyrrole ring, indole ring, isoindole ring, pyrazole ring, indazole ring, imidazole ring, benzimidazole ring, triazole ring, benzotriazole ring, oxazole ring, benzoxazole ring, isoxazole ring, benzisoxazole ring, thiazole ring, benzothiazole ring, isothiazole ring, benzisothiazole ring, furan ring, benzofuran ring, and isobenzofuran ring.

In some more specific embodiments, the bridged compound can have the structure shown in Structure 3 below.

Structure 3

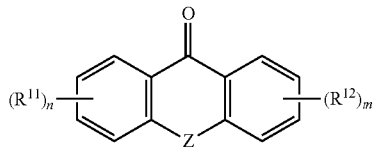

In Structure 3, $R^{11}$ and $R^{12}$ are independently selected from the group consisting of H; optionally substituted alkyl, alkenyl, alkynyl, aryl, aralkyl, heterocyclyl, or heteroaryl; $C_2$-$C_6$ polyol; $OR^3$; $SR^3$; $S(=O)R^3$; $S(=O)_2R^3$; $NR^9R^{10}$; $CH_2(OCH_2CH_2)_xOCH_3$; $C(=O)R^4$; halogen; nitro; cyano; sulfonyl; and perfluoroalkyl. Z, n, m, x and the remaining variables continue to be defined as above.

As mentioned above, flow batteries of the present disclosure can include an active material in at least one of the electrolyte solutions that is either an unbound form of the bridged compound, or a coordination compound containing the bridged compound as at least one ligand. The electrolyte solutions themselves will now be discussed in further detail.

Additional details concerning coordination compounds containing the bridged compounds as at least one ligand are provided hereinbelow.

In some embodiments, at least one of the electrolyte solutions used within the flow batteries of the present disclosure can be an aqueous solution. Compositions of the present disclosure, which are discussed further hereinbelow, can similarly include an aqueous solution in which a coordination compound is disposed. As used herein, the term "aqueous solution" refers to a homogeneous liquid phase with water as a predominant solvent in which a component of interest (e.g., a coordination compound or other active material) is at least partially solubilized, ideally fully solubilized. This definition encompasses both solutions in water and solutions containing a water-miscible organic solvent as a minority component of an aqueous phase.

Illustrative water-miscible organic solvents that can be present in an aqueous solution of the present disclosure include, for example, alcohols and glycols, optionally in the presence of one or more surfactants or other components discussed below. In more specific embodiments, an aqueous solution can contain at least about 98% water by weight. In other more specific embodiments, an aqueous solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, an aqueous solution of the present disclosure can be free of water-miscible organic solvents and consist of water alone as a solvent.

In further embodiments, an aqueous solution of the present disclosure can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, an aqueous solution can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in an aqueous solution of the present disclosure can help promote dissolution of a coordination compound and/or reduce viscosity of the aqueous solution for conveyance through a flow battery, for example.

In illustrative embodiments, the electrolyte solutions and compositions of the present disclosure can have a pH suitable for maintaining the active material in a desired state. In some embodiments, the pH can be an alkaline pH. As used herein, the term "alkaline pH" will refer to any pH value between 7 and 14. Alkaline pH values can be especially suitable for maintaining stability of coordination compounds, such as those containing the bridged compounds of the present disclosure and catecholate ligands, for example. As used herein, the term "catechol" refers to a compound having an aromatic ring bearing hydroxyl groups on adjacent carbon atoms (i.e., 1,2-hydroxyl groups), and the term "catecholate" refers to a catechol compound that is bound to a metal center via a metal-ligand bond. In some specific embodiments, the electrolyte solution in which the bridged compound or a coordination compound thereof is present can be maintained at a pH of about 9 to about 12. Other illustrative alkaline pH ranges that can be suitable include, for example, about 7 to about 7.5, or about 7.5 to about 8, or about 8 to about 8.5, or about 8.5 to about 9, or about 9.5 to about 10, or about 10 to about 10.5, or about 10.5 to about 11, or about 11 to about 11.5, or about 11.5 to about 12, or about 12 to about 12.5, or about 12.5 to about 13, or about 13 to about 13.5, or about 13.5 to about 14. As discussed below, acidic pH values can also be suitable in some cases.

In some embodiments, a suitable buffer can be present to maintain an alkaline pH. Illustrative buffers that can be suitable to maintain an alkaline pH include, but are not limited to, salts of phosphates, borates, carbonates, silicates, tris(hydroxymethyl)aminomethane (TRIS), 4-(2-hydroxyethyl)-1-piperazineethanesulfonic acid (HEPES), piperazine-N,N'-bis(ethanesulfonic acid) (PIPES), or any combination thereof.

In alternative embodiments, non-alkaline pH values can be present in the electrolyte solution in which the bridged compound is present. For example, in illustrative embodiments, the pH of the electrolyte solution can be acidic such as having a pH value ranging between 0 and about 3, or between about 1 and about 3, or between about 2 and about 5, or between about 4 and about 6, or between about 5 and about 7. Acidic pH values can be desirable in certain instances, particularly when the bridged compounds are not present in a coordination compound.

In addition to a solvent and an active material, an electrolyte solution can also include one or more mobile ions. In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $K^+$, $Mg^{2+}$, $Ca^{2+}$ and $Sr^{2+}$) and halides (e.g., $F^-$, $Cl^-$, or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafluoroborate, hexafluorophosphate and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

In various embodiments, a concentration of the active material in an electrolyte solution can range between about 0.1 M and about 3 M. This concentration range represents the sum of the individual concentrations of the oxidized and reduced forms of the active material. In more particular embodiments, the concentration of the active material can range between about 0.5 M and about 3 M, or between 1 M and about 3 M, or between about 1.5 M and about 3 M, or between 1 M and about 2.5 M.

In some specific embodiments, flow batteries of the present disclosure can feature a second electrolyte solution in which the active material is an iron hexacyanide complex. Iron hexacyanide complexes can be particularly desirable due to their facile electrode kinetics and reversible electrochemical behavior at oxidation-reduction potentials near the working electrochemical window of aqueous solutions. Hence, they can allow high open circuit potentials and cell efficiencies to be realized. Flow batteries of the present disclosure can therefore include a first electrolyte solution in contact with a negative electrode of the flow battery and a second electrolyte solution in contact with the positive electrode of the flow battery. In more specific embodiments, the first electrolyte solution can contain the bridged compounds discussed herein in an appropriate form and the second electrolyte solution can contain an iron hexacyanide complex as the active material.

As indicated above, the bridged compounds of the present disclosure can, in some embodiments, be present in flow batteries and compositions in the form of at least one ligand within a coordination compound. In more specific embodiments, coordination compounds of the present disclosure can have a formula of

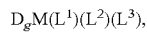

$D_gM(L^1)(L^2)(L^3)$, wherein M is a transition metal; D is ammonium, tetraalkylammonium ($C_1$-$C_4$ alkyl), or an alkali metal ion (e.g., $Li^+$, $Na^+$ and/or $K^+$); g ranges between 0 and 6; and $L^1$, $L^2$ and $L^3$ are ligands and at least one of $L^1$, $L^2$ and $L^3$ is the bridged compound. In such embodiments, the bridged compound can serve as a redox non-innocent ligand. As used herein, the term "redox non-innocent ligand" refers to donor molecule (ligand) in a coordination compound that can undergo reversible oxidation and reduction, possibly in addition to redox activity of the metal center in the coordination compound as well.

In some embodiments, each of $L^1$, $L^2$ and $L^3$ can be the bridged compound, and in other embodiments, less than all of $L^1$, $L^2$ and $L^3$ can be the bridged compound. When the bridged compound fills less than all the open coordination sites in a coordination compound, additional ligands can be present. Suitable additional ligands that can be present in combination with the bridged compound in a coordination compound include, for example, an unsubstituted catecholate, a substituted catecholate, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that the ligands defined in the foregoing lists can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA). Still other examples of additional ligands that can be present include, for example, carbonyl or carbon monoxide, nitride, oxo, hydroxo, water, sulfide, thiols, pyridine, pyrazine, bipyridine, bipyrazine, ethylenediamine, diols (including ethylene glycol), terpyridine, diethylenetriamine, triazacyclononane, tris(hydroxymethyl)aminomethane, and the like.

In more specific embodiments, at least one of $L^1$, $L^2$ and $L^3$ can be a catecholate ligand or a substituted catecholate ligand and at least one of $L^1$, $L^2$ and $L^3$ can be the bridged compound. Catecholate ligands can be especially desired to include with a coordination compound serving as an active material in a flow battery due to the relatively good aqueous solubility of these groups, their ready complexation of metals, and their contribution to a high negative half-cell potential when present.

Due to their variable oxidation states, transition metals can be highly desirable for use within the active material of a flow battery. Cycling between the accessible oxidation states can result in the conversion of chemical energy into electrical energy, thereby further supplementing the energy transference conveyed by the bridged compounds discussed herein. Lanthanide elements can be used similarly in this regard. In general, any transition metal or lanthanide metal can be present as the metal center in the coordination compounds of the present disclosure. In more specific embodiments, the metal center can be a transition metal selected from among Al, Cr, Ti and Fe. For purposes of the present disclosure, Al is to be considered a transition metal. In more specific embodiments, the transition metal can be Ti. Other suitable transition and main group metals that can be present in the coordination compounds of the present disclosure include, for example, Ca, Ce, Co, Cu, Mg, Mn, Mo, Ni, Pb, Pd, Pt, Ru, Sb, Sr, Sn, V, Zn, Zr, and any combination thereof. In various embodiments, the coordination compounds can include a transition metal in a non-zero oxidation state when the transition metal is in both its oxidized and reduced forms. Cr, Fe, Mn, Ti and V can be particularly desirable in this regard.

Illustrative flow battery configurations that can incorporate the foregoing electrolyte solutions and active materials will now be described in further detail. The flow batteries of the present disclosure are, in some embodiments, suited to sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof. Further, while the disclosure herein is generally directed to flow batteries, it is to be appreciated that other electrochemical energy storage media can incorporate the electrolyte solutions and coordination compounds described herein, specifically those utilizing stationary electrolyte solutions.

In some embodiments, flow batteries of the present disclosure can include: a first chamber containing a negative electrode contacting a first aqueous electrolyte solution; a second chamber containing a positive electrode contacting a second aqueous electrolyte solution, and a separator disposed between the first and second electrolytes solutions. The chambers provide separate reservoirs within the cell, through which the first and/or second electrolyte solutions circulate so as to contact the respective electrodes and the separator. Each chamber and its associated electrode and electrolyte solution define a corresponding half-cell. The separator provides several functions which include, for example, (1) serving as a barrier to mixing of the first and second electrolyte solutions, (2) electrically insulating to reduce or prevent short circuits between the positive and negative electrodes, and (3) to facilitate ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolyte solutions can be transported from separate storage tanks through the corresponding chambers. In a charging cycle, electrical power can be applied to the cell such that the active material contained in the second electrolyte solution undergoes a one or more electron oxidation and the active material in the first electrolyte solution undergoes a one or more electron reduction. Similarly, in a discharge cycle the second active material is reduced and the first active material is oxidized to generate electrical power.

In more specific embodiments, illustrative flow batteries of the present disclosure can include: (a) a first aqueous electrolyte solution containing a first active material; (b) a second aqueous electrolyte solution containing a second active material; (c) a separator positioned between said first and second aqueous electrolyte solutions; and (d) a mobile ion in the first and second aqueous electrolyte solutions. As described in more detail below, the separator can be an ionomer membrane, and it can have a thickness of less than 100 microns and have an associated net charge that is the same sign as that of the first and second active materials.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—CF=$CF_2$, FLEMION™ and SELEIVIION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, polyvinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of chemicals (e.g., active materials) passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination compound, the average diameter of the coordination compound can be about 50% greater than the average pore size of the porous membrane. On the other hand, if a porous membrane has substantially uniform pore sizes, the average diameter of the coordination compound can be about 20% larger than the average pore size of the porous membrane. Likewise, the average diameter of a coordination compound is increased when it is further coordinated with at least one water molecule. The diameter of a coordination compound of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries of the present disclosure can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 mA/cm$^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The diffusion rate of the first and second active materials through the separator can be less than about $1\times10^{-5}$ mol cm$^{-2}$ day$^{-1}$, or less than about $1\times10^{-6}$ mol cm$^{-2}$ day$^{-1}$, or less than about $1\times10^{-7}$ mol cm$^{-2}$ day$^{-1}$, or less than about $1\times10^{-9}$ mol cm$^{-2}$ day$^{-1}$, or less than about $1\times10^{-11}$ mol cm$^{-2}$ day$^{-1}$, or less than about $1\times10^{13}$ mol cm$^{-2}$ day$^{-1}$, or less than about $1\times10^{-15}$ mol cm$^{-2}$ day$^{+1}$.

The flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox active materials under the conditions of the operating flow battery. Further exemplary embodiments of a flow battery provide that (a) the first active material has an associated net positive or negative charge and is capable of providing an oxidized or reduced form over an electric potential in a range the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" will refer to the amount of ions passing through the ionomer membrane, balancing the charge associated with the flow of external electricity/electrons. That is, the flow battery is capable of operating or operates with the substantial exclusion of the active materials by the ionomer membrane.

Flow batteries incorporating the electrolyte solutions of the present disclosure can have one or more of the following operating characteristics: (a) where; during the operation of the flow battery, the first or second active materials comprise less than about 3% of the molar flux of ions passing through the ionomer membrane; (h) where, the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 μm, less than about 75 μm, less than about 50 μm, or less than about 250 μm; (f) where the flow battery is capable of operating at a current density of greater than about 100 mA/cm$^2$ with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than available from a single battery cell. In such cases, several battery cells can be connected in series such that the voltage of each cell is additive. This forms a bipolar stack. An electrically conductive, but non-porous material (e.g., a bipolar plate) can be employed to connect adjacent battery cells in a bipolar stack; which allows for electron transport but prevents fluid or gas transport between adjacent cells. The positive electrode compartments and negative electrode compartments of individual cells can be fluidically connected via common positive and negative fluid manifolds in the stack. In this way, individual cells can be stacked in series to yield a voltage appropriate for DC applications or conversion to AC applications.

In additional embodiments, the cells, cell stacks, or batteries can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. Any of these locations can be suitable for deploying a solid buffer material in accordance with the embodiments of the present disclosure. The cells, cell stacks, and batteries of this disclosure can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack); storage tanks and piping for containing and transporting the electrolyte solutions; control hardware and software (which may include safety systems); and a power conditioning unit. The flow battery cell stack accomplishes the conversion of charging and discharging cycles and determines the peak power. The storage tanks contain the positive and negative active materials, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Where not otherwise defined hereinabove or understood by one having ordinary skill in the art, the definitions in the following paragraphs will be applicable to the present disclosure.

As used herein, the term "energy density" will refer to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad \text{(Equation 1)}$$

where OCV is the open circuit potential at 50% state of charge, (26.8 A-h/mol) is Faraday's constant, and $[e^-]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad \text{(Equation 2)}$$

where [active materials] is the molar concentration of the active material in either the negative or positive electrolyte, whichever is lower, and N is the number of electrons transferred per molecule of active material. The related term "charge density" will refer to the total amount of charge that each electrolyte contains. For a given electrolyte, the charge density can be calculated by Equation 3

$$\text{Charge density} = (26.8 \text{ A-h/mol}) \times [\text{active material}] \times N \quad \text{(Equation 3)}$$

where [active material] and N are as defined above.

As used herein, the term "current density" will refer to the total current passed in an electrochemical cell divided by the geometric area of the electrodes of the cell and is commonly reported in units of mA/cm$^2$.

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" can be described as the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using Equation 4:

$$V_{eff,RT} = V_{discharge}/V_{charge} \times 100\% \quad \text{(Equation 4)}$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

In light of the above, the present disclosure also explicitly describes compositions containing the bridged compounds discussed herein. In more particular embodiments, some compositions of the present disclosure can include a coordination compound having at least one ligand that is a bridged compound having Structure 1 or a salt thereof, wherein $Ary^1$, $Ary_2$, Z, $R^1$-$R^{10}$, and z are defined as above. In more specific embodiments, some compositions of the present disclosure can include a coordination compound having at least one ligand that is a bridged compound having Structure 3 or a salt thereof, wherein $R^{11}$, $R^{12}$, n, m and the remaining variables are defined as above.

In some embodiments, compositions of the present disclosure can include a coordination compound having the formula $$D_gM(L^1)(L^2)(L^3),$$

wherein M is a transition metal; D is ammonium, tetraalkylammonium ($C_1$-$C_4$ alkyl), or an alkali metal ion (e.g., $Li^+$, $Na^+$ and/or $K^+$); g ranges between 0 and 6; and $L^1$, $L^2$ and $L^3$ are ligands and at least one of $L^1$, $L^2$ and $L^3$ is the bridged compound. In some embodiments, the transition metal is Ti, and in some or other embodiments, at least one of $L^1$, $L^2$ and $L^3$ is a catecholate ligand or a substituted catecholate ligand.

In further embodiments, compositions of the present disclosure can additionally include an aqueous solution in which the coordination compound is disposed. In some embodiments, additional components such as organic co-solvents, supporting electrolytes, viscosity modifiers, and the like can be present in the aqueous solutions. These additional components are discussed in further detail hereinabove.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A flow battery comprising:
    a first half-cell containing a first electrolyte solution; and
    a second half-cell containing a second electrolyte solution;
    wherein at least one of the first electrolyte solution and the second electrolyte solution comprises:
        an active material comprising a bridged compound having a structure of:

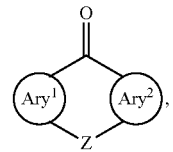

a coordination compound thereof, or a salt thereof;
wherein:
   $Ary^1$ is a substituted aromatic ring or a substituted heteroaromatic ring, wherein the aromatic or heteroaromatic ring of $Ary^1$ is substituted with one or more of an alkyl substituted with one or more of hydroxyl, carboxyl, amine, or sulfonyl; $C_2$-$C_6$ polyol; $OR^3$; $SR^3$; $S(=O)R^3$; $S(=O)_2R^3$; $NR^9R^{10}$; $CH_2(OCH_2CH_2)_xOCH_3$; $C(=O)R^4$; and/or sulfonyl;
   $Ary^2$ is an unsubstituted aromatic ring, an unsubstituted heteroaromatic ring, a substituted aromatic ring, or a substituted heteroaromatic ring, wherein, when substituted, the aromatic or heteroaromatic ring of $Ary^2$ is substituted with one or more of an alkyl substituted with one or more of hydroxyl, carboxyl, amine, or sulfonyl; $C_2$-$C_6$ polyol; $OR^3$; $SR^3$; $S(=O)R^3$; $S(=O)_2R^3$; $NR^9R^{10}$; $CH_2(OCH_2CH_2)_xOCH_3$; $C(=O)R^4$; and/or sulfonyl; and
   Z is $CR^1R^2$, $NR^8$, O, S, $S(=O)$, or $S(=O)_2$, wherein:
   $R^1$ is H; unsubstituted or substituted Akyl; $C_2$-$C_6$ polyol; $OR^3$; $SR^3$; $S(=O)R^3$; $S(=O)_2R^3$; $NR^9R^{10}$; $CH_2(OCH_2CH_2)_xOCH_3$; or $C(=O)R^4$;
   $R^2$ is an alkyl substituted with one or more of hydroxyl, carboxyl, amine, or sulfonyl; $C_2$-$C_6$ polyol; $OR^3$; $SR^3$; $S(=O)R^3$; $S(=O)_2R^3$; $NR^9R^{10}$; $CH_2(OCH_2CH_2)_xOCH_3$; or $C(=O)R^4$; and
   $R^3$ is H; an alkyl substituted with one or more of hydroxyl, carboxyl, amine, or sulfonyl; $(CH_2CH_2O)_xCH_3$; $C(=O)NR^5R^6$; or $C(=O)R^7$; and
   $R^5$ and $R^6$ are, independently, H; an alkyl substituted with one or more of hydroxyl, carboxyl, amine, or sulfonyl; $(CH_2CH_2O)_xCH_3$; or $CH_2(OCH_2CH_2)_xOCH_3$; and
   $R^7$ is OH or an alkyl substituted with one or more of hydroxyl, carboxyl, amine, or sulfonyl; and
   $R^4$ is $R^5$, $OR^5$, or $NR^5R^6$; and
   $R^8$ is H; an alkyl substituted with one or more of hydroxyl, carboxyl, amine, or sulfonyl; $(CH_2CH_2O)_xCH_3$; $CH_2(OCH_2CH_2)_xOCH_3$; $C(=O)R^5$; $C(=O)OR^5$; or $C(=O)NR^5R^6$; and
   $R^9$ and $R^{10}$ are, independently, H; an alkyl substituted with one or more of hydroxyl, carboxyl, amine, or sulfonyl; $(CH_2CH_2O)_xCH_3$; or $CH_2(OCH_2CH_2)_xOCH_3$; and
   x is an integer ranging between 0 and 100.

2. The flow battery of claim 1, wherein Z is $NR^8$.

3. The flow battery of claim 1, wherein:
$Ary^1$ is a substituted benzene ring, naphthyl ring, pyridine ring, pyrazine ring, pyrimidine ring, triazine ring, quinolone ring, isoquinoline ring, phthalazine ring, quinazoline ring, quinoxaline ring, thiophene ring, benzothiophene ring, pyrrole ring, indole ring, isoindole ring, pyrazole ring, indazole ring, imidazole ring, benzimidazole ring, triazole ring, benzotriazole ring, oxazole ring, benzoxazole ring, isoxazole ring, benzisoxazole ring, thiazole ring, benzothiazole ring, isothiazole ring, benzisothiazole ring, furan ring, benzofuran ring, or isobenzofuran ring; and Ary² is a substituted or unsubstituted benzene ring, naphthyl ring, pyridine ring, pyrazine ring, pyrimidine ring, triazine ring, quinolone ring, isoquinoline ring, phthalazine ring, quinazoline ring, quinoxaline ring, thiophene ring, benzothiophene ring, pyrrole ring, indole ring, isoindole ring, pyrazole ring, indazole ring, imidazole ring, benzimidazole ring, triazole ring, benzotriazole ring, oxazole ring, benzoxazole ring, isoxazole ring, benzisoxazole ring, thiazole ring, benzothiazole ring, isothiazole ring, benzisothiazole ring, furan ring, benzofuran ring, or isobenzofuran ring.

4. The flow battery of claim 1, wherein the active material is an unbound form of the bridged compound.

5. The flow battery of claim 1, wherein the active material is the coordination compound comprising the bridged compound as at least one ligand.

6. The flow battery of claim 5, wherein the coordination compound has a formula of $D_gM(L^1)(L^2)(L^3)$;

wherein

M is a transition metal;

D is ammonium, tetraalkylammonium, or an alkali metal ion; g ranges between 0 and 6; and $L^1$, $L^2$ and $L^3$ are ligands, at least one of $L^1$, $L^2$ and $L^3$ being the bridged compound.

7. The flow battery of claim 6, wherein the transition metal is Ti.

8. The flow battery of claim 6, wherein at least one of $L^1$, $L^2$ and $L^3$ is a catecholate ligand or a substituted catecholate ligand.

9. The flow battery of claim 1, wherein the bridged compound has a structure of

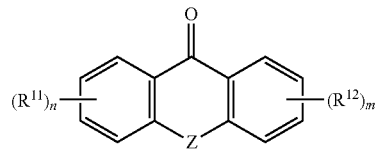

wherein:

$R^{11}$ and $R^{12}$ are, independently, alkyl substituted with one or more of hydroxyl, carboxyl, amine, or sulfonyl; $C_2$-$C_6$ polyol; $OR^3$; $SR^3$; $S(=O)R^3$; $S(=O)_2R^3$; $NR^9R^{10}$; $CH_2(OCH_2CH_2)$—$OCH_3$; or $C(=O)R^4$; and n is 0, 1, 2, or 3 and m is 1, 2, or 3.

10. The flow battery of claim 9, wherein the active material is an unbound form of the bridged compound.

11. The flow battery of claim 9, wherein the active material is the coordination compound comprising the bridged compound as at least one ligand.

12. The flow battery of claim 11, wherein the coordination compound has a formula of:

$D_gM(L^1)(L^2)(L^3)$;

wherein

M is a transition metal; D is ammonium, tetraalkylammonium, or an alkali metal ion;

g ranges between 0 and 6; and $L^1$, $L^2$ and $L^3$ are ligands, at least one of $L^1$, $L^2$ and $L^3$ being the bridged compound.

13. The flow battery of claim 12, wherein the transition metal is Ti.

14. The flow battery of claim 12, wherein at least one of $L^1$, $L^2$ and $L^3$ is a catecholate ligand or a substituted catecholate ligand.

15. The flow battery of claim 1, wherein Z is S.

16. The flow battery of claim 1, wherein Z is S(=O).

17. The flow battery of claim 1, wherein Z is S(=O)₂.

18. The flow battery of claim 1, wherein Z is $CR^1R^2$.

19. The flow battery of claim 1, wherein Z is O.

* * * * *